(12) United States Patent
Menzel

(10) Patent No.: US 8,303,684 B2
(45) Date of Patent: Nov. 6, 2012

(54) METHOD OF REMOVING ACIDIC GAS COMPONENTS FROM A GAS MIXTURE

(75) Inventor: Johannes Menzel, Waltrop (DE)

(73) Assignee: UHDE GmbH, Dortmund (DE)

( * ) Notice: Subject to any disclaimer, the term of this patent is extended or adjusted under 35 U.S.C. 154(b) by 422 days.

(21) Appl. No.: 12/764,130

(22) Filed: Apr. 21, 2010

(65) Prior Publication Data

US 2010/0269693 A1 Oct. 28, 2010

(30) Foreign Application Priority Data

Apr. 22, 2009 (DE) .......................... 10 2009 018 444

(51) Int. Cl.
*B01D 53/14* (2006.01)

(52) U.S. Cl. ............... 95/163; 95/172; 95/173; 95/174; 95/176; 95/177; 95/192; 95/199; 95/208; 95/204; 95/223

(58) Field of Classification Search .................. None
See application file for complete search history.

(56) References Cited

U.S. PATENT DOCUMENTS

| | | | |
|---|---|---|---|
| 3,910,777 A * | 10/1975 | Jakob | 95/161 |
| 4,254,094 A * | 3/1981 | Hegarty | 423/658.3 |
| 4,397,660 A * | 8/1983 | Van der Pas-Toornstra | 95/162 |
| 4,533,373 A * | 8/1985 | Butz et al. | 62/625 |
| 7,419,646 B2 * | 9/2008 | Cadours et al. | 423/220 |
| 7,604,684 B2 | 10/2009 | Menzel | |
| 2004/0115109 A1* | 6/2004 | Minkkinen et al. | 423/228 |
| 2006/0196357 A1* | 9/2006 | Menzel | 95/235 |
| 2009/0199712 A1* | 8/2009 | Menzel et al. | 95/163 |
| 2009/0241773 A1* | 10/2009 | Lechnick et al. | 95/44 |
| 2010/0062926 A1* | 3/2010 | Woodhouse et al. | 502/55 |
| 2010/0132563 A1* | 6/2010 | Pan et al. | 96/181 |

* cited by examiner

*Primary Examiner* — Duane Smith
*Assistant Examiner* — Pankti Patel
(74) *Attorney, Agent, or Firm* — Jonathan Myers; Andrew Wilford

(57) ABSTRACT

A pressurized gaseous mixture acidic gas and a useful gas is directly in a first absorption column with a physically acting absorption agent. Then the absorption agent loaded with the acid gas and useful gas is subdivided into first and second streams. The first stream is fed directly to a recycle flash container and there decompressed to reclaim the useful gas, extract the acidic gas from the absorption agent, and form a recycled gas containing the useful gas and acidic gas. The second stream is through a second absorption column to the recycle flash container. Some of the recycled gas from the recycle flash container is compressed and fed through the second absorption column so as to therein directly contact the second stream, and then the recycle gas that has passed through the second absorption column and contacted the second stream is returned to the gaseous mixture.

5 Claims, 1 Drawing Sheet

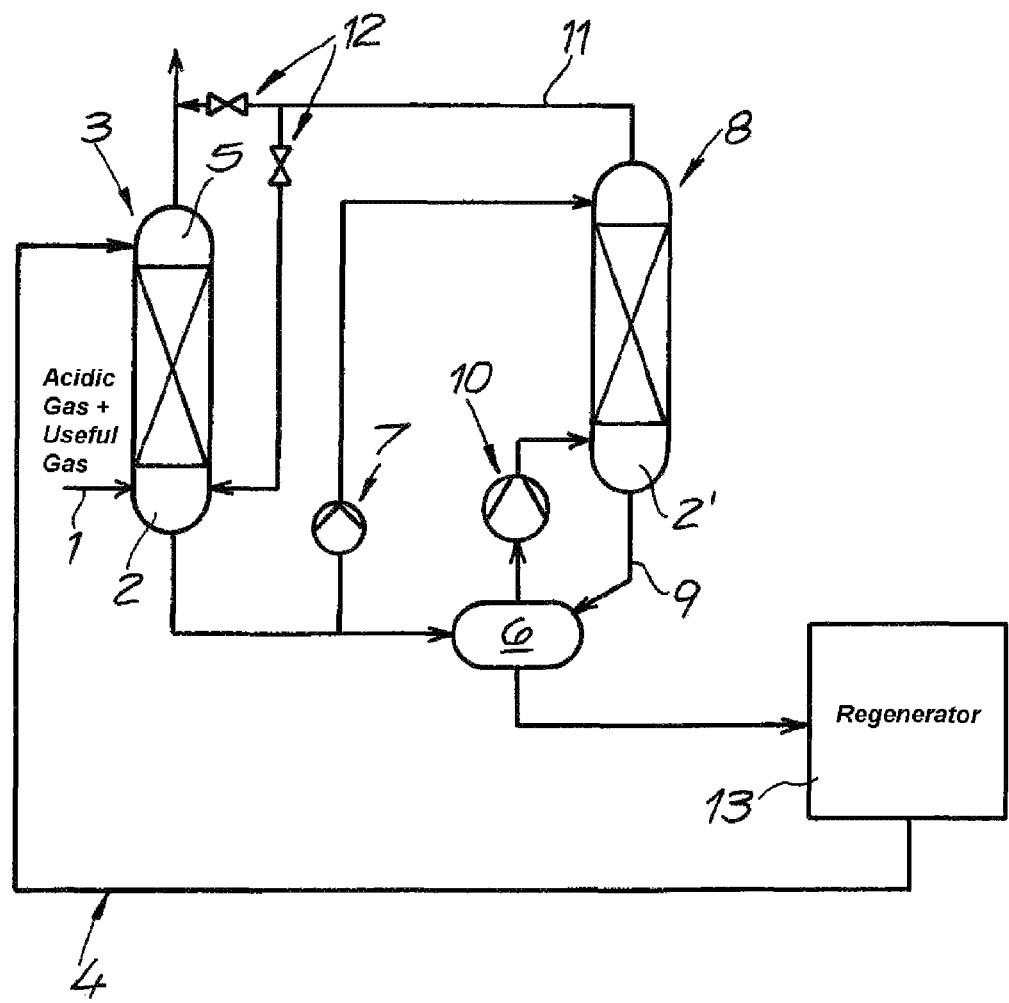

METHOD OF REMOVING ACIDIC GAS COMPONENTS FROM A GAS MIXTURE

FIELD OF THE INVENTION

The present invention relates to a method of removing acidic gas components from a gas mixture. More particularly this invention concerns a method of removing hydrogen sulphide and carbon dioxide from a gas mixture.

BACKGROUND OF THE INVENTION

It is known to remove hydrogen sulfide and carbon dioxide in particular, from a gaseous mixture. A physically acting absorbing medium is contacted in an absorption column with the pressurized gaseous mixture so that the acidic gas is absorbed at least partially along with some of a useful gas, and the thus loaded absorption agent is subsequently extracted from the initial absorption column and, to recover the useful gas, is fed to a recycle flash container in which the loaded absorption agent will be decompressed to form a recycled gas that contains the useful gas and the acidic gas. The recycled gas can then be compressed for further use.

As a useful gas, the synthetic or natural gas mixture can contain for instance hydrocarbon compounds, or as acidic gas, hydrogen sulfide, organic sulfur compounds and/or carbon dioxide.

From a process point view as well as to avoid ecological damage, at least most of the acidic gas must be removed before further using a gas mixture such as natural domestic gas. In practice, chemically acting absorption agents as well as physically acting absorption agents such as for example polypropylene carbonate, methanol, N-methyl-pyrrolidon, N-formylmorpholine, N-acetylmorpholine, and mixtures of these substances are used. Appropriate absorption agents are for instance known under the brand names Selexol®, Pursiol®, Genosorb®, and Morphysorb®.

A certain portion of the useful gas is typically taken is up by the absorption agent when a gaseous mixture is cleaned in an absorption column using a physically acting absorption agent, which creates a problem. To be able to recover the useful gas U.S. Pat. No. 7,604,684 describes feeding the absorption agent after washing the gaseous mixture in an absorption column to a recycle flash container where the loaded absorption agent is decompressed. The decompression creates a recycle gas that contains useful and acidic gas components. The recycle gas formed in the recycle flash container is compressed for further use and, because of its high acid content, is fed to the gaseous mixture before it is cleaned using the physically acting absorption agent. The absorption agent, which was taken out of the recycle flash container, will be regenerated and fed again to the absorption column in a cycle.

Furthermore, it is known from practice to feed the recycled gas formed in the recycle flash container to an additional, smaller absorption column where the recycled gas will be separated at least partially from the acidic gas by means of a fresh, regenerated absorption agent. It is disadvantageous that an additional, regenerated absorption agent will be required thus increasing the total required quantity of absorption agent that is fed into a cycle. Accordingly, the entire cycle must be designed to allow large quantities of absorption agent to circulate so that the investment and operating costs are relatively high.

OBJECTS OF THE INVENTION

It is therefore an object of the present invention to provide an improved method of removing acidic gas components from a gas mixture.

Another object is the provision of such an improved method of removing acidic gas components from a gas mixture that overcomes the above-given disadvantages, in particular that is particularly efficient and cost-effective.

SUMMARY OF THE INVENTION

An acidic gas is removed from a pressurized gaseous mixture containing the acidic gas and a useful gas by first, in a first absorption column, directly contacting the pressurized gaseous mixture with a physically acting absorption agent so that at least a portion of the acidic gas and a portion of the useful gas are taken up by the absorption agent. Then the absorption agent loaded with the acid gas and useful gas is extracted from the first absorption column and subdivided into first and second streams. The first stream is fed directly to a recycle flash container and there decompressed to reclaim the useful gas, extract the acidic gas from the absorption agent, and form a recycled gas containing the useful gas and acidic gas. The second stream is through a second absorption column to the recycle flash container. Some of the recycled gas from the recycle flash container is compressed and fed through the second absorption column so as to therein directly contact the second stream, and then the recycle gas that has passed through the second absorption column and contacted the second stream is returned to the gaseous mixture.

According to a preferred embodiment of the invention, the portion of the discharged, second stream constitutes up to a third of the total quantity of the absorption agent. The invention is in particular based on the discovery that the highly enriched absorption agent coming from the first absorption column can still be used to a certain extent to remove the acidic gas from the recycled gas if the recycled gas, which is formed in the recycle flash container, was initially compressed and then brought into direct contact under pressure with the already loaded absorption agent. The contact is created advantageously in the counterflow in the second absorption column.

A pump can feed the second stream can be fed to the head of the second absorption column.

The absorption agent's absorption capacity depends particularly on the governing pressure. The pressure generally ranges from 10 bar to 150 bar, and is preferably above 50 bar, and is most preferably above 70 bar, to allow an effective absorption of the acidic gas in the first absorption column. The loaded absorption agent is decompressed in the recycle flash container thus creating the flash gas. A pressure below the operating pressure of the first absorption column must be used so a large portion of the useful gas and only a portion of the acidic gas that is as small as possible will be freed. Finally, the formed flash gas will be compressed for an at least partial cleaning in the second absorption column, whereby a pressure is advantageously used that corresponds approximately to the pressure in the first absorption column, or that is higher than the pressure in the first absorption column. The absorption agent's absorption capacity can be further increased by increasing pressure in the second absorption column.

In accordance with a first further formation of the method, the recycled gas that was extracted from the second absorption column and partially cleared of acidic gas, is fed to a sump of the first absorption column, and this recycled gas is subsequently fed through the absorption column together with the gaseous mixture, and brought into direct contact with the absorption agent for further cleaning. Compared with the method known from above-cited U.S. Pat. No. 7,604,684, where the recycled gas is fed directly from the recycle flash container to the sump of the only provided absorption column at that location, a more efficient removal of acidic gas results while the absorption agent requirements remain the same.

According to a second further version of the method, the recycled gas that was extracted from the second absorption column is fed to the gas stream of the gaseous mixture after the stream leaves the first absorption column. An additional removal of acidic gas from the recycled gas is not provided for after leaving the second absorption column. This is particularly advantageous when only part of the acidic gas component should be removed from the gaseous mixture and an incomplete cleaning of the recycled gas can be accepted. Since the recycled gas will not be fed through the first absorption column and a part of the acidic gas will be removed in the second absorption column, the cleaning capacity that is therefore not required can be used to increase the flow volume of the gaseous mixture that is fed into the sump 2. The method according to the invention can therefore be used to increase the total capacity of an already existing acidic gas absorption system without a change of the existing absorption agent cycle being required.

Furthermore, it is also possible to combine the first and second further methods in such a manner that the recycled gas that was extracted from the second absorption column is fed through appropriate control devices to the first absorption column's sump and/or to the gaseous mixture after it leaves the first absorption column. Moreover, a variable division of the recycled gas that was extracted from the second absorption column can be realized. This embodiment can be used to obtain fixed default values at various ancillary conditions and/or to respond to varying inflow quantities of the gaseous mixture.

The absorption agent is regenerated in the known manner after leaving the recycle flash container, so that the acidic gas that was absorbed by the absorption agent is removed for instance by means of the further decompression and/or heating, the regenerated absorption agent being recycled to the first absorption column.

BRIEF DESCRIPTION OF THE DRAWING

The above and other objects, features, and advantages will become more readily apparent from the following description, reference being made to the accompanying drawing whose sole FIGURE is a schematic view of a plant for carrying out the method of this invention.

SPECIFIC DESCRIPTION

As seen in the drawing a gaseous mixture containing a useful gas and an acidic gas is fed to a sump 2 of a first absorption column 3 via a supply line 1 and there contacted in counterflow with a fresh, regenerated, physically acting absorption agent that is supplied through a conduit 4 to a head 5 of the first absorption column 3. The absorption agent absorbs the acidic gas at least partially and also a portion of the is useful gas when directly contacting the gaseous mixture.

A recycle flash container 6 serves to reclaim the useful gas absorbed by the absorption agent. The loaded absorption agent that was extracted from the absorption column 3 is divided into first and second partial flows or streams. The first stream is fed directly from the column 3 to the recycle flash container 6 and decompressed, thus creating recycled gas containing useful and acidic gas. In contrast, the second stream of loaded absorption agent is compressed and fed to a head of a second absorption column 8 by a pump 7. The second stream of the loaded absorption agent flows down through the second absorption column 8, leaves it via its sump 2', and is fed via a conduit 9 to the recycle flash container 6 where it is decompressed while creating additional recycled gas.

The recycled gas formed in the recycle flash container 6 is compressed by a compressor 10 and fed to back to the sump of the second absorption column 8 to flow up through it in counterflow to the second descending stream of the loaded absorption agent so that a portion of the acidic gas component contained in the recycled gas is absorbed by the second stream of the absorption agent due to direct contact and the pressure prevailing in the second absorption column 8. The recycled gas, which is at least partially freed of acidic gas in the absorption column 8, can be returned to the sump 2 of the first absorption column 3 and/or to the gaseous mixture stream after leaving the first absorption column 3. Valves 12 can be provided as control equipment to divide the flow in the return conduit 11.

The absorption agent collected in the recycle flash container 6 is processed in a regenerator 13, which is known per se and only shown schematically in the FIGURE, and cleaned of its acidic gas before being fed again via the absorption agent recycle conduit 4 to the first absorption column 3.

I claim:

1. A method of removing acidic gas from a pressurized gaseous mixture containing the acidic gas and a useful gas, the method comprising the steps of:
   in a first absorption column, directly contacting the pressurized gaseous mixture with a physically acting absorption agent so that at least a portion of the acidic gas and a portion of the useful gas are taken up by the absorption agent;
   thereafter extracting the absorption agent loaded with the acid gas and useful gas from the first absorption column and subdividing it into first and second streams;
   feeding the first stream directly to a recycle flash container and there decompressing the first stream to reclaim the useful gas, extract the acidic gas from the absorption agent, and form a recycled gas containing the useful gas and acidic gas;
   feeding the second stream through a second absorption column to the recycle flash container;
   compressing and feeding some of the recycled gas from the recycle flash container through the second absorption column and contacting it therein directly with the second stream; and
   returning the recycle gas that has passed through the second absorption column and contacted the second stream to the gaseous mixture.

2. The method defined in claim 1 wherein the recycle gas that has passed through the second absorption column and contacted the second stream is returned to the gaseous mixture by the step of:
   feeding the second stream after passing through the second absorption column to a sump of the first absorption column.

3. The method defined in claim 1 wherein the recycle gas that has passed through the second absorption column and contacted the second stream is returned to the gaseous mixture by the step of:
   feeding the second stream after passing through the second absorption column to the first absorption column.

4. The method defined in claim 3 wherein a portion of the acidic gas is removed in the second column and that unused cleaning capacity of the recycle gas not needed in the first column is used to increase the throughflow volume of the gas mixture in the first column.

5. The method defined in claim 1, further comprising the step of:

regenerating the absorption agent from the flash container and returning the regenerated absorption agent to the first column.

* * * * *